3,137,628
ANALGESIC AND DIURETIC 2-ACETYLAMINO AND 2-PROPIONYLAMINO Δ²-DIHYDRO-1,3-THIAZINES
Werner Meiser, Wuppertal-Vohwinkel, and Hans Henecka, Friedrich Hoffmeister, and Wolfgang Wirth, Wuppertal-Elberfeld, Germany, assignors to Farbenfabriken Bayer Aktiengesellschaft, Leverkusen, Germany, a corporation of Germany
No Drawing. Filed Oct. 23, 1962, Ser. No. 232,577
Claims priority, application Germany Oct. 25, 1961
7 Claims. (Cl. 167—65)

The present invention relates to novel therapeutic compositions and the administration of those compositions both orally and parenterally, and more especially relates to 2-acylamino-Δ²-dihydro-1,3-thiazines and their non-toxic pharmaceutically acceptable salts in unit dosage form and wherein the essential active therapeutic thiazine derivative is present in an amount ranging from approximately 50 to 100 milligrams per unit dose for preparations in solid form and a 2.5 to 10 percent aqueous injectable solution for preparations in liquid form. The compositions and preparations of the present invention are useful as analgesics and diuretics depending upon the dosage, the administration for diuretic purposes being larger than for analgesic purposes.

The present invention fulfills a need in providing compositions which have moderately strong activity falling between the very potent analgesics such as morphine and the comparatively weak analgesics of the aspirin type.

It has been found, according to the present invention, that acyl derivatives of 2-amino-Δ²-dihydro-1,3-thiazine (also known as 2-amino-penthiazoline-Δ² or, in its tautomeric form, as 2-imino-penthiazoline) having the formula:

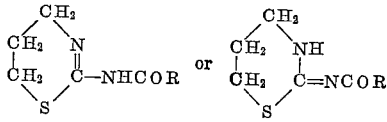

wherein R is a methyl or ethyl radical, possess outstanding pharmacodynamic properties. Thus, for example, the acetyl and propionyl compounds have an excellent analgesic effect and, in somewhat higher dosages, a diuretic effect.

Compounds of the above ring system have hitherto not been used as medicaments as it has not been known that they have good analgesic and/or diuretic properties.

The monoacetyl-2-imino-penthiazoline has already been briefly described by Schöberl et al. in Annalen der Chemie, 614, page 95 (1958), whereas the propionyl compound is new. The two compounds are acylamides. It is surprising that, nevertheless, they act as bases which freely dissolve in water with a pH of about 8. Their basicity enables the formation of outstandingly crystalline salts which dissolve in water with a pH of about 4 to 5.5. The salts are very stable, storable compounds, whereas the acetyl and propionyl bases tend to decompose on prolonged storage. This can be explained by the fact that they can be regarded as cyclic isothioureas of which it is known, at least in the open form, that they are not very stable. The acyl bases distill without decomposition at a high vacuum, the acetyl compound being a solid with a melting point of 50 to 53° C. and the propionyl compound being a liquid.

The following non-limitative examples represent typical formulations responding to the present invention.

EXAMPLE I

A series of dry ampules, each of which contained 68.685 milligrams of sterile 2-acetylamino-Δ²-dihydro-1,3-thiazine succinate corresponding to 50 milligrams of active substance per ampule, were emptied and the contents of each ampule was dissolved in 2 milliliters of sterile water to provide a preparation ready for administration.

EXAMPLE II

A series of ampules, each of which contained 68.685 milligrams of 2-acetylamino-Δ²-dihydro-1,3-thiazine succinate in aqueous solution and sterile filtered, were filled and then freeze-dried. The contents of each ampule was then removed and dissolved in 2 milliliters of sterile water to provide a preparation ready for administration.

EXAMPLE III 137.37 grams of 2-acetylamino-Δ²-dihydro-1,3-thiazine succinate corresponding to 100 milligrams of active substance were ground with 40 grams of lactose, 10 grams of talc, 1 gram of magnesium stearate and 111.63 grams of corn starch and compressed into a 300 milligram tablet.

EXAMPLE IV 137.37 grams of 2-acetylamino-Δ²-dihydro-1,3-thiazine succinate was ground with 10 grams of talc, 1 gram of magnesium stearate and 151.63 grams of lactose and compressed into a 300 milligram tablet.

EXAMPLE V

Each 60 milligrams of 2-propionylamino-Δ²-dihydro-1,3-thiazine was dissolved in water and mixed with a solution of 20.55 milligrams of succinic acid in water, sterile filtered, filled into an ampule and freeze-dried. The contents of each ampule were dissolved in 2 milliliters of sterile water to provide a preparation ready for administration.

EXAMPLE VI

Each 72.6 milligrams of 2-propionylamino-Δ²-dihydro-1,3-thiazine hydrochloride corresponding to 60 milligrams of active substance in aqueous solution was sterile filtered, freeze-dried and filled into an ampule. The contents of each ampule were removed and dissolved in 2 milliliters of sterile water to provide a preparation ready for administration.

EXAMPLE VII

Each 103 milligrams of 2-acetylamino-Δ²-dihydro-1,3-thiazine succinate corresponding to 75 milligrams of active substance were melted with one of the usual cone or suppository materials and then shaped into cones or suppositories.

In the case of analgesic substances, there are the strongly effective type of compound such as morphine, and the relatively weakly effective type of compound of the pyrazolone-phenacetin-aspirin group. The analgesic effect of the present compounds lies about half way between these two groups. Due to the high water solubility of the bases, as well as of the salts, any desired pharmaceutical preparations can be prepared, such as tablets, dragees, cones, solutions for parenteral injection, aqueous or alcoholic solutions for peroral application, etc. In the case of solid preparations, it is preferable to use the salts because of their higher melting points. In the case of aqueous preparations, bases or salts can be used, with or without suitable buffering, expediently to a pH of about 6. As single doses of the solid preparations, 25 to 100 milligrams may be considered as the practical range for adults. As injectable solutions, 2.5 to 10 percent aqueous solutions are especially suitable.

Since, in the case of the evaluation of the analgesia tests, it is a question of the registration of reflexes, which are occasioned by pain (W. Wirth, Arch. exp. Path. Pharm., 216, pages 77–83/1952), a large number of different tests were utilized on the greatest variety of animals, wherein every test clearly showed the effectiveness of the substances. For the sake of uniformity, all the tests were based on the free bases but the salts act fully analogously corresponding to their content of base.

2-ACETYLAMINO-$\Delta^2$-DIHYDRO-1,3-THIAZINE

(a) Hot Plate Test on the Mouse

[Ref.: Chen, Y. P., and Beckmann, H., Science, 113, 631 (1951)]

In this test, mice are placed on a copper plate heated to 56° C. In this arrangement, untreated animals show an excitation reaction within 8 to 12 seconds (licking of the fore and hind paws). The lengthening of the reaction time to more than 30 seconds is denoted as the analgesic effect. The DE 50 is that dose at which 50 percent of the animals exhibit such an extension of the reaction time. The substance was administered subcutaneously; ten animals were used per dose. The DE 50 was 33 mg./kg. Having regard to the LD 50, the therapeutic index is calculated from:

$$\frac{LD\ 50}{DE\ 50} \text{ to } \frac{145}{33} = 4.4$$

(b) Heat Ray Test on the Mouse's Tail

This test was evolved by Wolf, Hardy and Goodell [J. Clin. Invest. 19, 659 (1940)] for investigation on humans and was modified by Wirth (loc. cit.) for animal experiments. Untreated animals react, under the influence of a focused heat ray, by withdrawing the tail within four seconds. The prolongation of the reaction time to 12 seconds is evaluated as analgesic effect. The substance was here administered subcutaneously or orally, using 10 animals per dose. The subcutaneous DE 50 was 6 mg./kg. corresponding to a therapeutic index of 23. In the case of oral administration, the DE 50 was 11 mg./kg., corresponding to a therapeutic index of 45.

(c) Heat Ray Test on the Mouse's Nose

[Meier's test; cited by Hotovy, Mercks Jahresbericht LXX, 18, 156/57]

If a focused heat ray is directed on the nose of mice, then the untreated animals react within 2 to 3 seconds with defensive movements. After irradiation times of more than 15 seconds, burning occurs.

For the evaluation of the excitation time prolongations, which are used as a measurement of the analgesic effect, the maximum irradiation time of 15 seconds is fixed as being equal to 100 percent analgesia. The difference between the maximum time (15 seconds) and the normal reaction time (2 to 3 seconds) is divided by 10. The number resulting therefrom of 1.2 to 1.3 seconds—depending on the preliminary control—is reckoned at 10 percent analgesia. Accordingly, 50 percent analgesia (=A 50) means, in this test, that of the animals used, on an average, excitation time of 8.5 to 9 seconds is achieved.

The substance was also tested in this test on ten mice per dose, with subcutaneous administration. A 50 was 9 mg./kg., corresponding to a therapeutic index of 16.

(d) Analgesic Test (Pressure Test) on the Rat's Paw

[Ref.: Randall and Selitto, Arch. int. Pharm., 111, 409 (1947)]

In the rat, the pressure sensitivity is tested of a paw edematously modified by the injection of yeast into the planta pedis. Defensive movements of the animal are reckoned as "pain" reaction. The quantitative measurement of the "analgesic" effect is carried out by registration of the pressure increase, in mm. Hg, compared with a preliminary control leading to the defensive movement. For comparison, besides a paw modified by inflammation, an untreated paw is also tested.

The application of the substance took place subcutaneously, four hours after the injection of the yeast. The "analgesia" test itself was carried out over a period of three hours.

The increasing of the excitation threshold by 100 mm. Hg, achieved in an average of the animals used, is designated as $\Delta 100$.

For the compound, the inflamed paw gave a $\Delta 100$ value of 20 mg./kg.; therapeutic index:

$$\frac{LD\ 50}{\Delta 100} = \frac{150}{20} = 7.5$$

On the normal paw, we found a $\Delta 100$ value of 25 mg./kg.; therapeutic index=6.

(e) Flexion Test on the Rat's Hock Modified by Inflammation

[Re.: La Belle and Tislow, J. Pharm. Exp. Ther., 98, 19, 1950]

In this test, 0.2 ml. of a 1 percent silver nitrate solution is injected into the hind hock of rats about eighteen hours before the use of the material to be tested. An acute arthritis develops. Upon flexing the inflamed joint by the experimenter, the animals give a cry of pain. The failure of this reaction under the action of the substance is reckoned as the "analgesic" effect.

In the case of subcutaneous administration, the DE 50 for the substance was 20 mg./kg.; therapeutic index=7.5.

(f) Tooth Test on the Rabbit

[Ref.: Hertle, Schanne and Staib, Arzneimittel-Forsch., 7, 311 (1957)]

In the case of this method, the increasing of the threshold for an electrical stimulus is regarded as a measure of the "analgesic" effect. The stimulus is given to an incisor tooth of the rabbit by way of electrodes.

This method was somewhat modified by us. Instead of the determination of the pain threshold by a short series of individual stimuli, a continuously increasing electrical permanent stimulus was used with the help of an automatically controlled potentiometer. In this manner, it was possible to obtain a more exact determination of the pain threshold. Technical data: 50 Hz, length of impulse: 10 msec., current density unchanged. Excitation time always up to the "pain" reaction. Gnawing movements and defensive movements were regarded as "pain" reactions. As stimulation device, there was used the neuroten (Siemens-Reiniger). The excitation threshold and threshold increase were measured in ma. Two methods of calculation were used for the evaluation:

(1) Average value of the increase of the excitation threshold in ma. in percent of the preliminary control. The increase of the average excitation threshold by 50 percent and by 100 percent is evaluated.

The substance was administered intravenously to ten animals per dose. After the application of 1.6 mg./kg., it came to an average of 50 percent, after 5.6 mg./kg. to 100 percent increase of the excitation threshold. The therapeutic index:

$$\frac{LD\ 50}{\text{Dose for 100\% threshold increase}} \quad \begin{array}{l} \text{Amounts to } \sim 1.4 \\ \text{referred to 50\%} \\ \text{increase of excitation} \\ \text{threshold} = 5 \end{array}$$

(2) $\Delta I_{max}$ within 20–120 minutes. This index is the average value of the maximum threshold increase obtained in the case of the individual animals, independently of the time of the commencement of the threshold increase, as a percentage of the preliminary control. This calculation also renders possible the verification of slighter effects. According to this method of calculation, 50% threshold increase is achieved by 1.3 mg./kg. and 100% by 2.5 mg./kg. The therapeutic index:

$$\frac{LD\ 50}{\text{Dose for } 100\% \text{ threshold increase}} \quad \begin{array}{l} \text{Amounts to } \sim 3.2 \\ \text{referred to } 50\% \\ \text{increase of excitation} \\ \text{threshold} = 6.4 \end{array}$$

In order to get some idea of the effect of the compound on carnivorous animals, the substance was tested on the cat.

(g) *Tail Pressure Test on the Cat*

[Ref.: Eddy, N. B., J. Pharm. Exp. Ther., 45, 339/1932]

In this test, the tip of the tail of the cat is squeezed by means of a spring pressure measuring device which gives the pressure used in kg./cm.² As excitation reaction, there is reckoned a defensive movement of the animal, accompanied by manifestations of noise (meowing). The test gives dependable dosage effect relationships only in the case of large numbers of animals. The following results are to be regarded as good approximations:

2-acetylaminl-$\Delta^2$-dihydro-1,3-thiazine subcutaneous:
1. Animal, 10 mg./kg.=$\Delta$kg. max. =2.8
2. Animal, 10 mg./kg.=$\Delta$kg. max. =8.7
3. Animal, 15 mg./kg.=$\Delta$kg. max. =4.0
4. Animal, 20 mg./kg.=$\Delta$kg. max. >10.0

Codeine-phosphate subcutaneous:
5. Animal, 5 mg./kg.=$\Delta$kg. max. =5.5
6. Animal, 10 mg./kg.=$\Delta$kg. max. =3.0
7. Animal, 20 mg./kg.=$\Delta$kg. max. >10.0

$\Delta$kg. max.=the largest tolerated pressure increase, in kg./cm.², difference in comparison with the preliminary control in question after application of the substance.

DIURESIS

The test is carried out on adult male rats of 140–190 g., which had fasted on the evening before the test but had received as much water as desired. Each dose was given to twenty animals. In the next twenty-two hours, the amount of urine excretion was determined.

| Time In Hours | Dose/kg. | Increase in Water Excretion in Comparison with Control in Percent |
|---|---|---|
| 0–1 | per os, 1.58 mg | 19 |
| 1–3 | | 23 |
| 3–6 | | 10 |
| 6–22 | | 0 |
| 0–1 | per os, 3.95 mg | 80 |
| 1–3 | | 83 |
| 3–6 | | 0 |
| 6–22 | | −8 |
| 0–1 | per os, 15.8 mg | 190 |
| 1–3 | | 57 |
| 3–6 | | 33 |
| 6–22 | | 13 |
| 0–1 | i.v., 1.58 mg | 60 |
| 1–3 | | 64 |
| 3–6 | | 14 |
| 6–22 | | −25 |

The compatibility of N-acetylamino-$\Delta^2$-dihydro-1,3-thiazine, measured as LD 50 on various animals, is as follows:

| Kind of Animal | Method of Administration | LD 50, mg./kg. |
|---|---|---|
| Mouse | Intravenous | 80 |
| Mouse | Subcutaneous | 145 |
| Mouse | Oral | 490 |
| Rat | Subcutaneous | 150 |
| Rabbit | Intravenous | 8 |

The sub-chronic toxicity was tested on dogs.

SUB-CHRONIC TOXICITY

Two dogs each received, on 115 consecutive working days, 5 mg./kg. of the substance in the form of the base, subcutaneously injected. In this time, no effect was observed on the weight, blood constitution, condition of the urine, liver function test (BSP and thymol cloud test). In the case of one animal, a light tremor was observed about two hours after the first injection, which had disappeared again the next morning. This symptom repeated itself in the same manner up to the 104th injection. In the case of the second animal, it was first observed after the 19th injection and after the 64th injection faded away.

2-PROPIONYLAMINO-$\Delta^2$-DIHYDRO-1,3-THIAZINE

In the case of this substance, the following analgesia values were obtained:

Heat ray test on mouse's tail DE 50, 25 mg. subcutaneously: therapeutic index=8

Heat ray test on the mouse's nose DE 50, 67 mg. subcutaneously: therapeutic index=$\sim$3

Pressure test on the rat's paw:
Inflamed DE 50, 55 mg. subcutaneously: therapeutic index=$\sim$3
Normal DE 50, 85 mg. subcutaneously: therapeutic index=$\sim$2

Tooth test on the rabbit DE 50, 3.7 mg. intravenously: therapeutic index=$\sim$7

The compatibility of 2-propionylamino-$\Delta^2$-dihydro-1,3-thiazine, measured as LD 50, is as follows:

| Kind of Animal | Method of Administration | LD 50, mg./kg. |
|---|---|---|
| Mouse | Subcutaneous | 100 |
| Rat | Subcutaneous | 155 |
| Rabbit | Intravenous | 25 |

The diuretic effect is set out in the following table:

| Time in Hours | Dose | Increase in Water Excretion in Comparison with Control in Percent |
|---|---|---|
| 1–6 | 4.3 mg./kg | 30–40. |
| 1–6 | 17 mg./kg | About 100. |

PREPARATION (1) *2-Acetylamino-Penthiazoline and Salts*

84 grams of 2-aminopenthiazoline are mixed with 80 milliliters of acetic anhydride. The vigorous reaction eases off at 100° C. The reaction mixture is subsequently heated on the water bath for fifty minutes. If it is desired to isolate the base, then the reaction mixture is distilled. B.P. 146° C./0.05 mm. Hg. Yield 105 grams. The distillate is stirred with 85 milliliters of absolute ether, whereupon the 2-acetylamino-penthiazoline crystallized. M.P. 50° C. to 53° C. Yield 90 grams.

If it is desired to isolate the hydrochloride, then the crude acetylation mixture is dissolved in 160 milliliters of absolute alcohol, stirred for one hour with charcoal, filtered off with suction and precipitated with 220 milliliters of ethereal hydrochloric acid, with the addition of 190 milliliters of ethyl acetate. The beautiful crystalline hydrochloride of 2-acetylamino-penthiazoline is washed with ethyl acetate. M.P. 174° C. Yield 114 grams.

The hydrochloride of melting point 174° C. is also obtained when 13 grams of 2-aminopenthiazoline are boiled for thirty minutes with 35 milliliters of acetic anhydride, after treatment with charcoal, filtered off with suction and the salt precipitated out from the filtrate with ethyl acetate, filtered off with suction and washed with dry ether.

53 grams of 2-diacetylamino-penthiazoline (oil of B.P. 137° C./0.2 mm. Hg., produced by peracetylation of 2-amino-penthiazoline with excess acetic anhydride) are dissolved in 105 milliliters of absolute alcohol and mixed, with cooling, with 48 milliliters of ethereal hydrochloric acid. Splitting off of an acetyl residue thereby takes place and the hydrochloride of 2-acetylamino-penthiazoline is completely precipitated out by the addition of ethyl acetate. M.P. 174° C. Yield 42 grams.

The hydrobromide of melting point 180° C. is obtained when 98.5 grams of 2-aminopenthiazoline hydrobromide are boiled for thirty minutes with 200 milliliters of acetic anhydride, after treatment with charcoal, filtered off with suction and the crystals obtained filtered off from the filtrate with suction and washed well with dry ether.

39.5 grams of 2-acetylamino-penthiazoline are dissolved in 200 milliliters of ethyl acetate and mixed with 19 grams of tartaric acid in 100 milliliters of absolute alcohol. The tartrate of 2-acetylamino-penthiazoline immediately precipitates out and quickly crystallizes completely. The pure white crystals are washed with ethyl acetate. M.P. 139° C. Yield 51 grams.

3.95 grams of 2-acetylamino-penthiazoline are dissolved in 20 milliliters of ethyl acetate and, with ice cooling, mixed with 1.5 grams of succinic acid in 10 milliliters of absolute alcohol. The succinate of 2-acetylamino-penthiazoline immediately crystallizes out as white crystals. M.P. 145° C. Yield 4.7 grams.

6 grams of 2-diacetylamino-penthiazoline are dissolved in 30 milliliters of ethyl acetate and, with ice cooling, mixed with 2.25 grams of succinic acid in 15 milliliters of absolute alcohol. 2-acetylamino-penthiazoline succinate crystallizes out. M.P. 145° C. Yield 5 grams.

3.95 grams of 2-acetylamino-penthiazoline are dissolved in 20 milliliters of ethyl acetate and mixed with 2.45 grams of crystalline phosphoric acid in 10 milliliters of absolute alcohol. 2-acetylamino-penthiazoline phosphate crystallizes out. M.P. 176° C. Yield 6.4 grams.

3.95 grams of 2-acetylamino-penthiazoline are dissolved in 20 milliliters of ethyl acetate and, with ice cooling, mixed with 3.3 grams of succinic acid monomethyl ester in 10 milliliters of absolute alcohol. Upon seeding, the methyl ester succinic acid salt of 2-acetylamino-penthiazoline of melting point 140° C. crystallizes out as white crystals.

3.95 grams of 2-acetylamino-penthiazoline are dissolved in 20 milliliters of ethyl acetate and, with ice cooling, mixed with 1.5 grams of maleic acid in 10 milliliters of absolute alcohol. The maleate of 2-acetylamino-penthiazoline immediately crystallizes out as white crystals of melting point 140° C.

(2) *2-Propionylamino-Penthiazoline and Salts*

21.2 grams of 2-aminopenthiazoline are mixed with 26.8 grams of propionic acid anhydride. The reaction goes to 100° C., and the reaction mixture is subsequently heated for a short time on the water bath. The resulting 2-propionylaminopenthiazoline is distilled. B.P. 153° C./0.25 mm. Hg. Yield 29 grams.

29 grams of propionylamino-penthiazoline are dissolved in 60 milliliters of absolute alcohol and, with ice cooling, precipitated with ethereal hydrochloric acid. The initial crystallization is increased with ethyl acetate and the hydrochloride of 2-propionylamino-penthiazoline is obtained as white crystals of melting point 176° C.

The same hydrochloride is obtained when the crude reaction mixture, without distillation, is mixed with 60 milliliters of absolute alcohol, stirred for one hour with charcoal and, after filtering off of the charcoal with suction, the filtrate precipitated with ethereal hydrochloric acid.

Further salts of 2-acetylamino- and 2-propionylamino-penthiazoline are produced in analogous manner.

What is claimed is:

1. A therapeutic composition consisting essentially of a 2.5 to 10 percent aqueous injectable solution of 2-acetylamino-$\Delta^2$-dihydro-1,3-thiazine succinate.

2. A therapeutic composition consisting essentially of a 2.5 to 10 percent aqueous injectable solution of 2-acetylamino-$\Delta^2$-dihydro-1,3-thiazine succinate buffered to a pH of 6 to 7.

3. A medicinal preparation in solid shaped unit dosage form comprising a carrier containing per unit dosage 50 to 100 milligrams of a pharmaceutically acceptable salt of 2-acetylamino-$\Delta^2$-dihydro-1,3-thiazine.

4. A method of effecting analgesia and diuresis in patients in need thereof which comprises administering to such patients a therapeutically effective amount of a composition of claim 1.

5. A method of effecting analgesia and diuresis in patients in need thereof which comprises administering to such patients a therapeutically effective amount of a composition comprising a carrier containing, as its essential active therapeutic agent, a compound selected from the group consisting of 2-acetylamino- and 2-propionylamino-$\Delta^2$-dihydro-1,3-thiazines and their non-toxic pharmaceutically acceptable salts.

6. A method of effecting analgesia and diuresis in patients in need thereof which comprises administering to such patients a therapeutically effective amount of 2-acetylamino-$\Delta^2$-dihydro-1,3-thiazine succinate in a pharmaceutical carrier.

7. A method of effecting analgesia and diuresis in patients in need thereof which comprises administering to such patients a therapeutically effective amount of 2-propionylamino-$\Delta^2$-dihydro-1,3-thiazine succinate in a pharmaceutical carrier.

References Cited in the file of this patent

FOREIGN PATENTS 752,003    Great Britain _____ July 4, 1956